United States Patent
Drottar et al.

[11] Patent Number: 6,094,683
[45] Date of Patent: Jul. 25, 2000

[54] LINK BUNDLING IN A NETWORK

[75] Inventors: Ken Drottar; David S. Dunning, both of Portland, Oreg.

[73] Assignee: Intel Corporation, Santa Clara, Calif.

[21] Appl. No.: 09/137,168

[22] Filed: Aug. 20, 1998

Related U.S. Application Data

[60] Provisional application No. 60/057,221, Aug. 29, 1997, and provisional application No. 60/081,220, Apr. 9, 1998.

[51] Int. Cl.[7] .......................... G06F 15/173; G06F 15/16
[52] U.S. Cl. .......................... 709/226; 709/227; 709/229
[58] Field of Search ................................. 710/45; 711/7; 714/7; 709/235, 226, 227, 229; 370/397, 378

[56] References Cited

U.S. PATENT DOCUMENTS

| | | | |
|---|---|---|---|
| 5,309,430 | 5/1994 | Verhille et al. | 370/60 |
| 5,365,519 | 11/1994 | Kozaki et al. | 370/378 |
| 5,502,836 | 3/1996 | Hale et al. | 711/170 |
| 5,506,840 | 4/1996 | Pauwels et al. | 370/397 |
| 5,509,122 | 4/1996 | Bartow et al. | 395/200 |
| 5,574,938 | 11/1996 | Bartow et al. | 709/235 |
| 5,657,439 | 8/1997 | Jones et al. | 714/7 |
| 5,826,110 | 10/1998 | Ozden et al. | 710/45 |

*Primary Examiner*—Le Hien Luu
*Attorney, Agent, or Firm*—R. Edward Brake; Intel Corporation

[57] ABSTRACT

A technique for bundling links is provided for increasing bandwidth and reducing latency. Two nodes in a network are configured to bundle two or more links connected between the two nodes. Data is transmitted between the two nodes by striping data over each link of the bundle. Data is transmitted in cells, and one or more cells are transmitted over each link of the bundle. The cells transmitted on one or more of the links include routing information.

25 Claims, 4 Drawing Sheets

LINK BUNDLING IN A NETWORK

CROSS-REFERENCE TO RELATED APPLICATIONS

This application is based upon U.S. Provisional application Ser. No. 60/057,221 filed on Aug. 29, 1997, entitled "Method and Apparatus For Communicating Between Interconnected Computers, Storage Systems, And Other Input/Output Subsystems," the disclosure of which is incorporated herein by reference, and U.S. Provisional application Ser. No. 60/081,220 filed on Apr. 9, 1998, entitled "Next Generation Input/Output," the disclosure of which is also incorporated herein by reference.

BACKGROUND OF THE INVENTION

The present invention relates generally to computer networks, and more particularly to a technique for bundling or combining two or more data links between two nodes in a network to improve bandwidth and reduce latency.

Current networks typically provide only a single data link between nodes. As a result, the bandwidths or data rates between most nodes are fixed. Thus, when traffic between two nodes increases, the fixed bandwidth link can create a system bottleneck, which can introduce unacceptable latencies.

The present invention overcomes some of the disadvantages of the prior art networks.

SUMMARY OF THE INVENTION

According to an embodiment of the present invention, a method of transmitting data over a bundled link between two nodes in a network system is provided. The method includes the steps of synchronizing each of a plurality of links between a first node and a second node. The first and second nodes are configured to bundle N of the links to create a bundled link between the first and second nodes. Also, data is transmitted from the first node to the second node by striping data over each link of the bundle.

DETAILED DESCRIPTION

Figure 1:
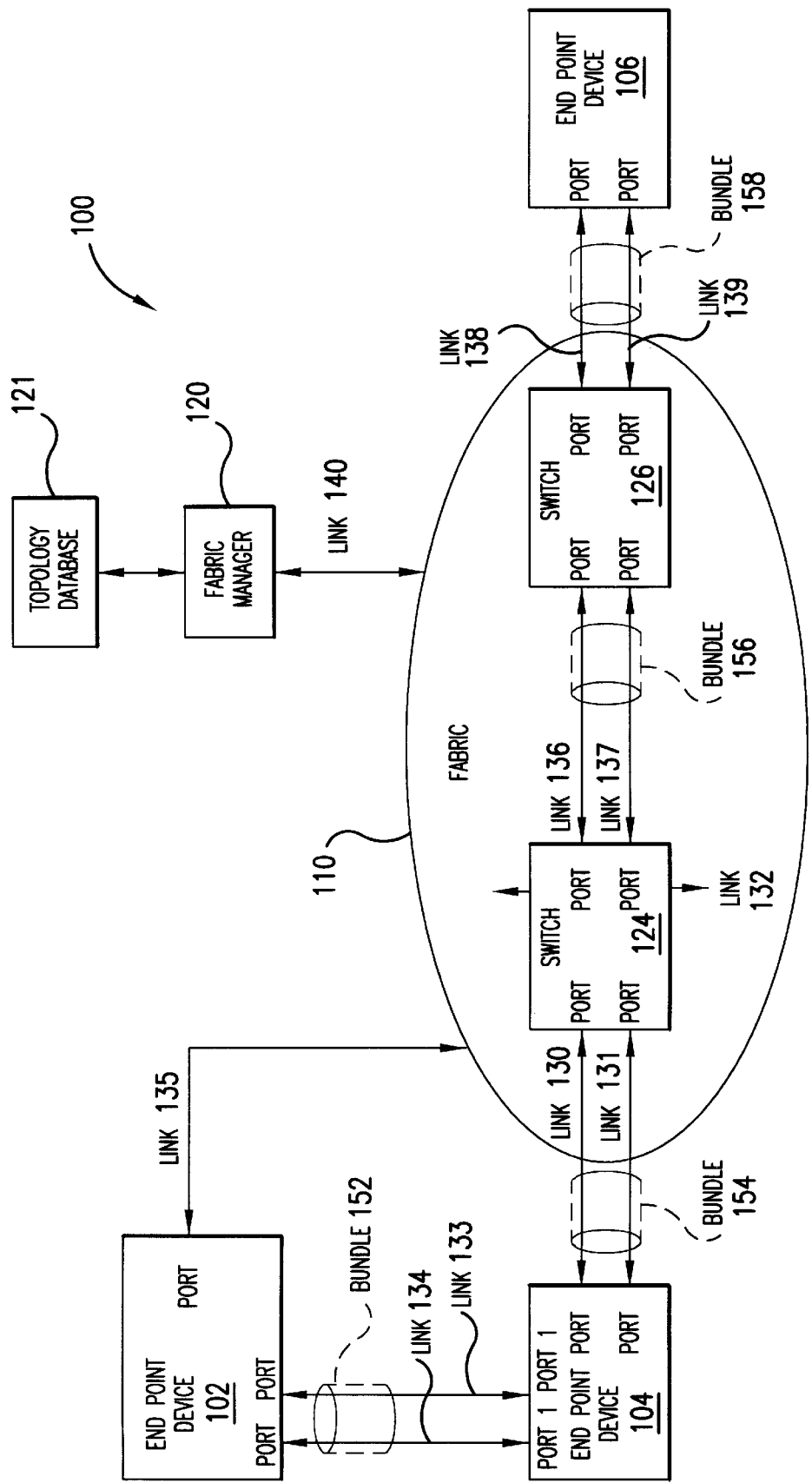
FIG. 1 is a block diagram that illustrates an exemplary network according to an embodiment of the present invention.

Referring to the Figures in which like numerals indicate like elements, FIG. 1 is a block diagram that illustrates an exemplary network according to an embodiment of the present invention. A network 100 includes a plurality of nodes interconnected via a plurality of links. A link includes one or more wires along with the protocol that runs over them that allows two nodes or other network-attached devices to be interconnected. In general, nodes can be one of at least two types of devices, such as an end point device (such as a personal computer, server, workstation, etc.) or an intermediate device (or switch). End point devices operate as either the source or destination of packets or cells that are transmitted over the network 100 to another end point device. Each switch can receive a cell on one or more ports and can output the cell through a different port based on the destination address contained in the cell.

Referring to FIG. 1, the exemplary network 100 includes a plurality of end point devices, including end point devices 102, 104 and 106. End point devices 102, 104 and 106 are coupled together via fabric 110. Fabric 110 includes a plurality of switches and links (some are shown in FIG. 1). In addition, two end point devices can be directly connected through one or more links.

Referring to FIG. 1, device 102 is connected to fabric 110 via link 135. Device 102 is also connected to end point device 104 via links 133 and 134. Links 133 and 134 can be bundled together to create a bundled link (or a bundle of links or bundle) 152. End point device 104 is connected to fabric 110 via links 130 and 131, which may be bundled together to form bundle 154. End point device 106 is connected to fabric 110 via links 138 and 139, which may be bundled together to form bundle 158. Fabric 110 includes a plurality of switches, including switches 124 and 126, and several links. Switch 124 is connected to end point device 104 via links 130 and 131, which may form bundle 154. Switch 126 is connected to switch 124 via links 136 and 137, which may be bundled together to form bundle 156. Switch 126 is also connected to end point device 106 via links 138 and 138, which may form bundle 158. Fabric manager 120 is connected to fabric 110 via link 140 and manages the overall operation and configuration of fabric 110.

In some network configurations, bandwidth demands may exceed the capabilities of a single link. According to the present invention, two or more links can be combined or bundled to create a single bundled link that provides increased bandwidth and reduced latency. Needed bandwidth can be provided by simply bundling two or more links, rather than using a single link to connect two nodes.

Figure 2:
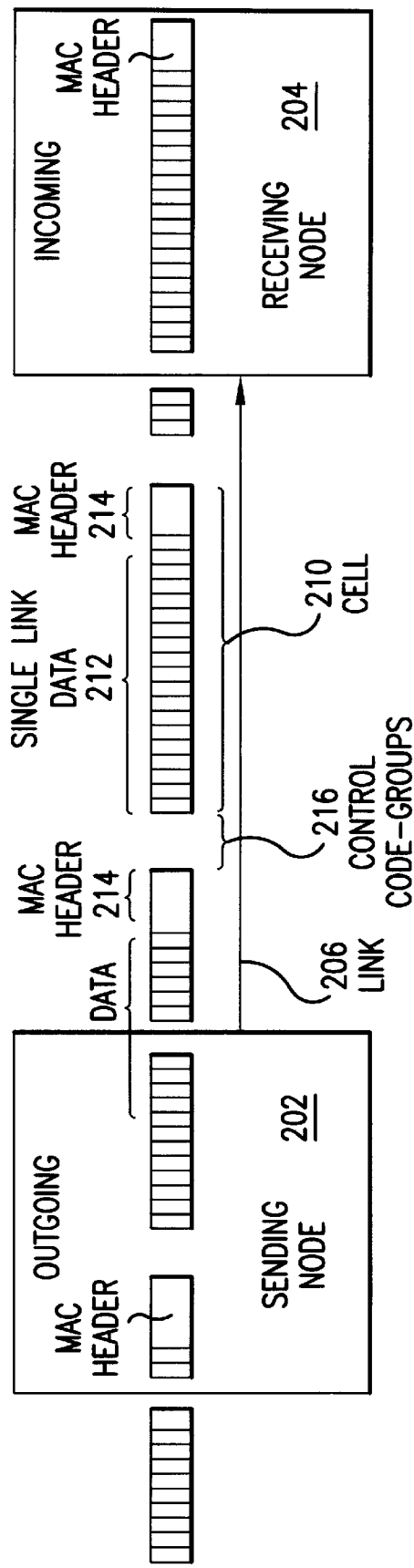
FIG. 2 is a diagram illustrating the transmission of data over a single link according to an embodiment of the present invention.

FIG. 2 is a diagram illustrating the transmission of data over a single link according to an embodiment of the present invention. A sending node 202 outputs a packet as a plurality of cells (in this example, four cells are shown). These cells are serially transmitted to a receiving node 204 via link 206. Each cell 210 includes a Medium Access Control (MAC) header 214 followed by data 212. The data 212 includes a plurality of data characters or bytes. The MAC header (which may be assembled, disassembled, and usually modified at each intermediate link point or switch) can include several fields, such as:

| version | pri/type | src/dest | fabcnt | length | reqid | ack/nak # | cmpid | reserve |
|---|---|---|---|---|---|---|---|---|
| [3:0] | [3:0] | [31:0] | [7:0] | [8:0] | [9:0] | | [9:0] | [9:0] |

The fields of the MAC header are as follows:
  version Of the protocol

| Version | Definition |
|---|---|
| 0000 | Initial Implementation |
| 0001 | Reserved for Future Use |
| ... | Reserved for Future Use |
| 1111 | Reserved for Future Use | priority/type Of the transaction. This field can be used to identify different priority transactions.

| Pri/Type | Definition |
|---|---|
| 0000 | Priority Zero Packet (Lowest) |
| 0001 | Priority One Packet |
| 0010 | Priority Two Packet |
| 0011 | Priority Three Packet (Highest) |
| 0100 | Reserved/TBD |
| ... | Reserved/TBD |
| 1111 | Reserved/TBD | src/dest Defines route or endpoints of the transaction through the fabric. Each source and destination is unique for a network total of, for example, 65,635 endpoints. This field may have different formats depending on fabric implementations.

fabcntl Fabric control, identifies special transactions such as management frames for switches within the fabric.

length Number of bytes units in data packet, irrespective of byte marks.

reqid Request ID number for transactions, also sequence numbers for associated port.

ack/nak# Defines how the cmpid is being acknowledged.

cmpid ID number of the last packet acknowledged on that port.

Other types of MAC headers or other headers can be used. Information transmitted over the link also includes control code-groups provided between cells to identify when the cell begins or ends or other control functions (such as link synchronization). The control code-groups 216 can include, for example, an end of cell delimiter (ECD) character, a start of cell delimiter (SCD) character, flow control characters, an even alignment character (EA) and idle characters (such as Idle1 or Idle2 characters). The idle characters are used to synchronize the link prior to sending data over the link, etc. The even alignment (EA) character is used to ensure that each cell begins on an even number character.

Figure 3:
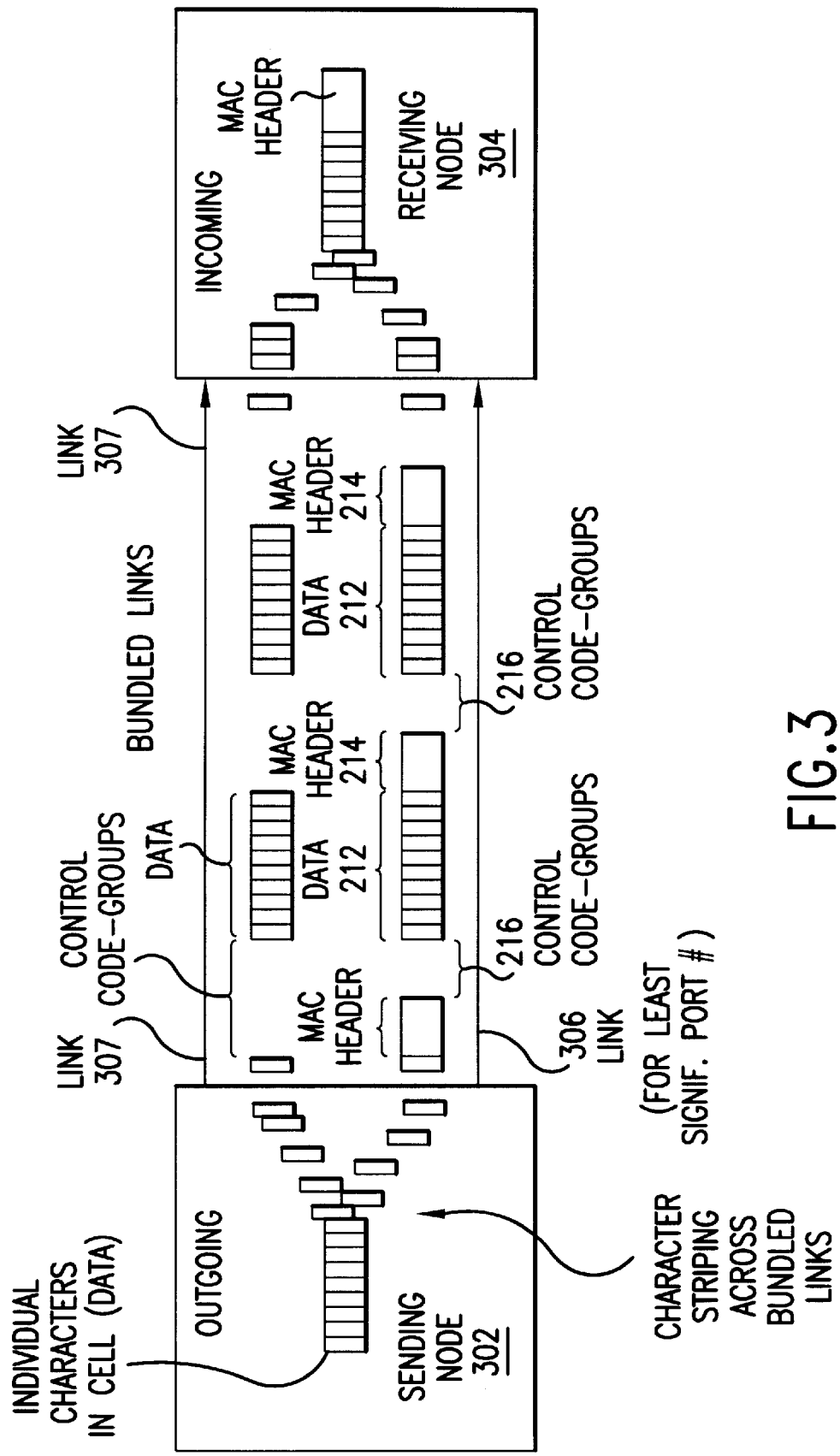
FIG. 3 is a diagram illustrating the transmission of data over a bundled link according to an embodiment of the present invention.

FIG. 3 is a diagram illustrating the transmission of data over a bundled link according to an embodiment of the present invention. In FIG. 3, a sending node 302 sends data across multiple bundled links to receiving node 304. Although only two links (links 306 and 307) are bundled in FIG. 3, any number of links can be bundled to provide increased bandwidth between two nodes. Nodes 302 and 304 may each be either an end point device (a computer, server, workstation or the like) or a switch.

In operation, according to an embodiment of the present invention, cells (or packets) are character (or byte) striped across bundled links (e.g., characters are distributed in alternating fashion across the available links of the bundle). Alternatively, other types of striping can be used. For example, groups of characters or groups of bytes may be striped across the bundle of links.

Note that in comparing the single link technique of FIG. 2 to the multiple link bundle of FIG. 3, the header of the first cell arrives at approximately the same time for both techniques. However, the last character of this four cell packet arrives at the receiving node much faster when using the link bundle of FIG. 3 as compared to the single link of FIG. 1 (assuming that all the links have approximately the same data rate or bandwidth). Data cannot typically be used by an application until all characters of a packet have arrived.

In addition, according to an embodiment of the present invention, link bundling uses the order of the ports to determine the ordering of the striping, although the present invention is not restricted in this respect. Thus, according to an embodiment of the present invention, the first character of the packet (character 0) is sent out over the sending node's least significant port number (port 0), the next character (character 1) sent out over the next most significant port number of the bundle (port 1) and so on. If there are only two links in the bundle, the link connected to the least significant port number (e.g., port 0) would receive characters 0, 2, 4, 6, 8, etc. While the link of the most significant port number (e.g., port 1) would receive characters 1, 3, 5, 7, 9, etc.

As a further example, if there are three links in the link bundle, the link connected to port 0 (the least significant port number) of the sending node would receive characters 0, 3, 6, 9, . . . of the cell, the link connected to port 1 would receive characters 1, 4, 7, 10, etc., and the link connected to port 2 (the most significant port number in the bundle) would receive characters 2, 5, 8, 11, . . . Other ordering techniques can be used to distribute the data across the bundled links.

Alternatively, if one link in a bundle has a higher bandwidth or a higher data rate than another link, characters can be disproportionately striped across the bundled links, transmitting a larger number (or higher percentage) of characters over the higher bandwidth links.

Moreover, to simplify the reassembly of the original data order at the receiving node or destination node, each receiving node should connect the links of the bundle to port numbers of the receiving node that correspond to the order of the sending device. In this manner, the ordering of the packets over the bundled links will be synchronized or known by both the sending and receiving nodes. This simplifies the reassembly or further striping or processing of the characters at the receiving node. For example, link 0 is connected between port 0 of the sending node and port 0 of the receiving node and link 1 is connected between port 1 of the sending node and port 1 of the receiving node. However, it is not a requirement that identical port numbers should be used to connect opposite ends of the same link. Rather, only the same order should be used at the two nodes. For example, the least significant port numbers at the sending and receiving nodes should be connected to the same link, the next most significant port numbers at each node should be connected to the next link, and so on. For example, in a four link bundle, ports 1, 2, 3 and 4 at a sending node can be connected to ports 0, 2, 5 and 7, respectively, at the receiving node.

Referring to FIG. 3, link 306 is connected to the least significant port number (e.g., port 0) of node 302, while link 307 is connected to the next highest port number (e.g., port 1) of node 302. According to an embodiment of the present invention, the MAC header is provided on the cells that are transmitted over only one (a predetermined one) of the links of the bundle to reduce overhead. In the embodiment illustrated in FIG. 3, the MAC header is transmitted only on the link connected to the least significant port number of the sending and receiving nodes. Another predetermined link can be selected instead to carry the MAC headers (or all links can carry the MAC headers). If the MAC header (including source and destination address) is transmitted on only one of the links of the bundle, the receiving node (e.g., switch) uses the MAC header (addresses) received over the one link for routing data received over all links in the bundle. Although not required, the links not carrying the MAC headers can be provided with a greater number of data characters (e.g., substituting data characters for where the MAC header would usually reside) than carried by the link that carries the MAC header. Also, as illustrated in FIG. 3, according to an embodiment of the present invention, the control code-groups are repeated for each link of the bundle.

Figure 4:
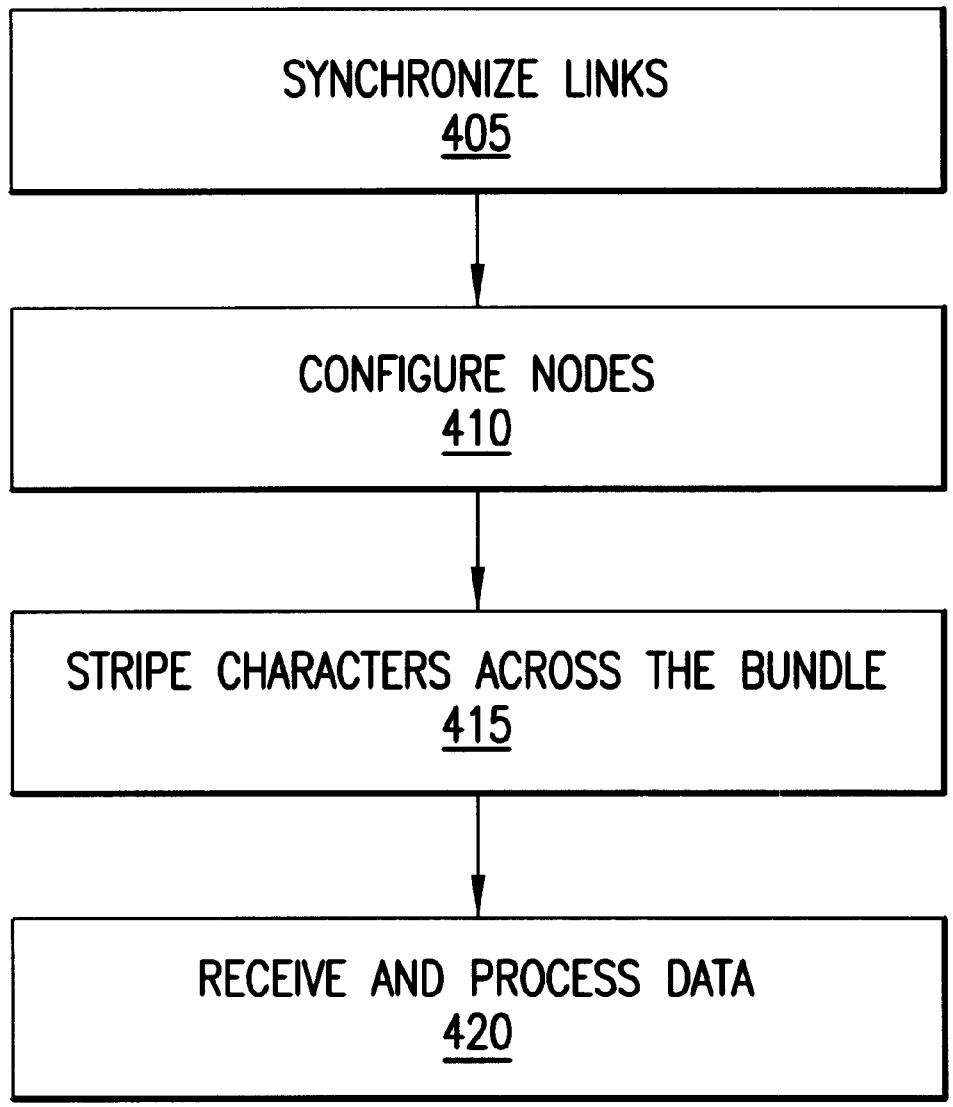
FIG. 4 is a flow chart illustrating operation of the network according to an embodiment of the present invention.

FIG. 4 is a flow chart illustrating operation of the network according to an embodiment of the present invention.

In step 405, each link is individually synchronized after power-up. Link synchronization simply ensures that the link is operating properly and can be performed in many different ways. According to an embodiment of the present invention, at power-up (or if link synchronization is lost) both nodes connected to a link begin sending Idle1 characters to the other node. When a node receives three Idle1 characters, the node then sends an Idle2 character. The link is synchronized when both nodes have received an Idle2 character from the other node. Other techniques can be used to synchronize both sides of a link.

At step 410, fabric manager 120 (FIG. 1) configures the various nodes in the network. Node configuration can include many different functions, and can be performed in many different ways. According to an embodiment of the present invention, the fabric manager 120 discovers the network topology (or accesses a network topology database that describes the topology of nodes and available links). The fabric manager then determines whether connected nodes should be connected together via a single link or through a bundle of links, including the number of links. In determining how to configure the nodes, three conditions should be met before links should be bundled: 1) both nodes should support bundling (e.g., nodes should be able to perform the striping of characters across the bundled links at the sending node, and perform reassembly or further striping at the receiving node); 2) multiple links are provided between the two nodes; and 3) bundling is a desired configuration. Other reasons may alternatively justify bundling links together.

The fabric manager 120 accesses the topology database 121 (FIG. 1) to identify the nodes in the network and the links existing between the nodes. The database 121 also indicates which nodes should be connected together via single link or through a bundle of links, and the number of links to be bundled. The topology database may be, in part, constructed by a system administrator based on, for example, an analysis of the three conditions noted above, for each node.

According to an embodiment of the present invention, the fabric manager 120 can bundle links to achieve, for example, either link matching or speed matching. If link matching is performed, the fabric manager 120 configures nodes in attempt to consistently bundle the same number of links (if possible) between nodes along a predetermined path through the network from a source (an end point device transmitting data) to a destination (another end point device). Although not required, using a consistent number of links in a bundle from node to node (link matching) reduces the amount of processing at each switch (because further striping or reassembly is not required at the switch), thereby improving performance and reducing latency.

If speed matching is performed, the fabric manager 120 configures the nodes to bundle links to provide a consistent data rate or bandwidth from node to node along a predetermined path through the network. For example a switch may have a two-link bundle as an input to the switch, where each link in the bundle has a data rate of 1.5 Gigabits per second (Gb/s), providing a total data rate of 3.0 Gb/s input into the switch. Another group of ports of the switch (e.g., used for output along the path) are connected to links having a data rate of 1.0 Gb/s links. In this case, to perform speed matching, fabric manager 120 configures the switch to create a bundle of three of the 1.0 Gb/s links to provide an overall speed of 3.0 Gb/s for the bundle on the output side of the switch, which matches the 3.0 Gb/s speed on the input side of the switch (The terms "input" and "output" are used simply for explanation here. Each link is actually bidirectional). In this manner, fabric manager 120 determines which links should be bundled between nodes. Other techniques can be used to select and bundle links.

After the fabric manager 120 has determined how the links should be bundled, the fabric manager 120 then configures each node. For example, the fabric manager can transmit configuration cells or packets to each node to provide commands to each node or to write to predetermined registers in each node to configure the node.

Referring to FIG. 4 again, at step 415, after two nodes have been configured to create a bundle of N links therebetween, the sending node then transmits the packet payload (data) by character striping (or other types of striping) across the bundled links. According to an embodiment of the present invention, to reduce overhead, the MAC headers are provided only for cells transmitted over one of the links (e.g., on the link connected to the least significant port number). Control code-groups can be repeated on each link.

At step 420, the characters are received and processed at the receiving node. If the receiving node is an end point device (e.g., a computer, a workstation) that is the final destination for the data, the receiving node (end point device) reassembles the data into its original form or order (e.g., unstripes the data). According to an embodiment of the present invention, the reassembly is simplified because the order of the character striping is based on the port numbers, as described above. When the data is reassembled (or unstriped), the data is then provided to the application at the receiving node (end point device) for use.

If the receiving node is a switch, then the switch examines the destination address in the MAC header. The switch looks up the destination address in a forwarding table to identify the port or ports to output the received data. (The forwarding table can be generated, in part, based on the configuration packet or cell received from the fabric manager 120.) If the forwarding table identifies only one port for outputting the data, this indicates that the data will be transmitted over a single link. If the forwarding table indicates a plurality of output ports, then this indicates that the data will be output by striping the characters across a bundle of M links, where M is the number of output ports identified by the forwarding table. If the data is input on a bundle of N links to a switch and output on bundle of M links from the switch, then the switch must perform a N-to-M redistribution or restriping of characters to forward the received data.

For example, data may be received by a switch over a three-link bundle and received at port numbers 4, 5 and 6 of the switch. Based on the forwarding table, the data may be output on ports 7, 8, 9 and 10 (creating a four-link bundle). The switch would receive the data over the three-link bundle connected to port 4, 5 and 6 and would then distribute or stripe the data over the four-link bundle connected to ports 7, 8, 9 and 10 of the switch. To distribute the data over the four-link bundle, the switch must perform further character striping (or segmentation) to distribute the received characters among the four output ports. Similarly, if only two output ports were designated by the forwarding table, the switch would perform a partial reassembly (partial unstriping) to distribute or stripe the characters across the two output ports. Other types of striping can be performed as well, such as striping in groups of characters.

In addition, a node can detect network congestion and may notify the fabric manager 120 of the congestion via an interrupt packet or by fabric manager 120 polling a status register of each node. Fabric manager 120 can then temporarily halt operation of two nodes and then reconfigure the two nodes to provide a bundle having an increased number of links. Data transmission is then continued between the links using the new (higher capacity) link bundle. All of these steps (detection of congestion, halting transmission, reconfiguring, and restarting data transmission) are transparent to the user or end point applications.

In addition, each node includes a port status register that indicates the status of each link connected to that port. The status register can indicate whether the link is bundled or not bundled, operating properly or that the link has failed (malfunctioned). A link failure can be detected by the fabric manager 120 either receiving an interrupt from the respective node (using an interrupt packet indicating that a particular link has failed), or by the fabric manager 120 polling the port status registers. When a link failure (or other problem) is detected, the fabric manager can remedy the situation by reconfiguring one or more nodes to substitute an operational link for the failed link in the bundle, to request service on the failed link, or to simply remove the link from the bundle.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of transmitting data comprising the steps of:
   synchronizing each of a plurality of links between a first node and a second node;
   configuring the first and second nodes to bundle N of the links to create a bundled link between the first and second nodes;
   transmitting data from the first node to the second node by striping data over each link of the bundle;
   wherein said step of configuring comprises the steps of:
   determining which links should be bundled; and
   configuring the first and second nodes to create the bundled link;
   wherein said step of determining comprises the step of:
   matching the number of links (N) in the bundle connected between the first and second nodes to a number of links (N) that are connected between the first node and a third node.

2. The method of claim 1 wherein said step of configuring comprises the step of sending a packet or cell to each node that includes instructions or commands.

3. The method of claim 1 wherein said step of synchronizing comprises the step of individually synchronizing each link.

4. A method of transmitting data comprising the steps of:
   configuring first and second nodes to create a bundle of N links between the first and second nodes;
   transmitting data from the first node to the second node by striping data over each link of the bundle; and
   the data transmitted over the bundle of links being transmitted as one or more cells, each cell including data characters and a header, the headers including routing information for the cells, wherein the headers are transmitted only over one of the links of the bundle between the first and second nodes.

5. The method of claim 4 wherein said routing information includes a source address and a destination address for the information.

6. The method of claim 4 wherein said header comprises a MAC header.

7. The method of claim 4 wherein said step of transmitting comprises the step of transmitting data from the first node to the second node by character striping the data over each link of the bundle.

8. The method of claim 4 wherein the first and second nodes each include a plurality of ports, each link in the bundle being connected to a port of the first node and a port of the second node, said step of transmitting comprises the step of transmitting data from the first node to the second node by striping data over each link of the bundle, the ordering of the striping based upon the order of the ports connected to the bundle of links.

9. The method of claim 8 wherein the data is striped over the bundle of links in the same order as the order of the port numbers of the first node that are connected to the bundle of links.

10. The method of claim 8 wherein the data is character striped over the bundle of links, with the first data character being transmitted over the link connected to the lowest port number of the first node, and with the second data character transmitted over the link connected to the next most significant port number of the first node.

11. The method of claim 4 wherein the links wherein the first node and second nodes each include a plurality of ports, each of the links of the bundle being connected between a first node port and a second node port.

12. The method of claim 11 wherein the bundle links are connected between the first node ports and the second node ports in a predetermined order.

13. The method of claim 12 wherein each first node port is connected through a link to a second node port in the same order based on port number.

14. The method of claim 4 and further comprising the steps of:
   receiving the data at the second node; and
   reassembling the data into its original order.

15. The method of claim 4 and further comprising the steps of:
   receiving the data at the second node via a bundled link of N links;
   identifying at the second node M output ports to be used for forwarding the data based on received routing information;

redistributing the data across the M identified output ports.

16. The method of claim 15 wherein M output ports comprises one output port, and wherein said step of redistributing the data across the M output ports comprises the step of reassembling the data into its original order and transmitting the data over a link connected to the one output port.

17. The method of claim 15 wherein said step of redistributing the data across the M output ports comprises the step of striping the data across the M output ports.

18. A method of configuring nodes in a network comprising:
synchronizing each of a plurality of links between a first node and a second node;
configuring the first and second nodes to bundle the plurality of links to create a first bundled link between the first and second nodes;
synchronizing each of a plurality of links between the second node and a third node;
configuring the second and third nodes to bundle the plurality of the links to create a second bundled link between the second and third nodes; and
matching the number of links in the first bundle to the number of links in the second bundle.

19. A method of configuring nodes in a network comprising:
synchronizing each of a plurality of links between a first node and a second node;
configuring the first and second nodes to bundle the plurality of links to create a first bundled link between the first and second nodes;
synchronizing each of a plurality of links between the second node and a third node;
configuring the second and third nodes to bundle the plurality of the links to create a second bundled link between the second and third nodes; and
matching the overall speed of the first bundle to the overall speed of the second bundle.

20. A method of transmitting data comprising:
synchronizing each of a plurality of links between a first node and a second node, each link being connected between a port on the first node and a port on the second node;
configuring the first and second nodes to bundle N of the links to create a bundled link between the first and second nodes;
transmitting data from the first node to the second node by striping data over each link of the bundle;
wherein the data striping is performed in an order based upon a numerical order of the ports of one of the nodes which are connected to the bundle of links.

21. The method of claim 20 wherein one of the first and second nodes is a sending node, and wherein the data striping is performed in an order based upon a numerical order of the ports of the sending node which are connected to the bundle of links.

22. The method of claim 21 wherein the data striping is performed over the links in the bundle in numerical order of the port numbers of the sending node, from least significant port number to most significant port number of the sending node.

23. A network system comprising:
a first node;
a second node;
a plurality of links coupled between the first and second nodes and synchronized to provide a first link bundle to transmit data, wherein data is transmitted between said first and second nodes by striping the data across the first link bundle;
a third node;
a plurality of links coupled between the third node and the second node and synchronized to provide a second link bundle to transmit data, wherein data is transmitted between said second and third nodes by striping the data across the second link bundle;
wherein the overall speed of the first bundle is the same as the overall speed of the second bundle.

24. The network system of claim 23 wherein each said first and second nodes comprises one of:
an end point device; and
a switch.

25. A network system comprising:
a first node;
a second node;
a plurality of links coupled between the first and second nodes and synchronized to provide a first link bundle to transmit data, wherein data is transmitted between said first and second nodes by striping the data across the first link bundle;
a third node;
a plurality of links coupled between the third node and the second node and synchronized to provide a second link bundle to transmit data, wherein data is transmitted between said second and third nodes by striping the data across the second link bundle; and
wherein the number of links of the first bundle is the same as the number of links of the second bundle.

* * * * *